(12) United States Patent
Hanzawa et al.

(10) Patent No.: US 7,085,045 B2
(45) Date of Patent: Aug. 1, 2006

(54) STEREOSCOPIC MICROSCOPE

(75) Inventors: Toyoharu Hanzawa, Mitaka (JP); Kazuo Morita, Hachioji (JP); Yasushi Namii, Hachioji (JP)

(73) Assignee: Olympus Corporation, Tokyo (JP)

( * ) Notice: Subject to any disclaimer, the term of this patent is extended or adjusted under 35 U.S.C. 154(b) by 23 days.

(21) Appl. No.: 10/653,968

(22) Filed: Sep. 4, 2003

(65) Prior Publication Data

US 2004/0051946 A1 Mar. 18, 2004

(30) Foreign Application Priority Data

Sep. 18, 2002 (JP) ............................ 2002-271962

(51) Int. Cl.
*G02B 21/22* (2006.01)

(52) U.S. Cl. .................... 359/376; 359/372; 359/434

(58) Field of Classification Search ................ 359/376, 359/462, 368, 372, 373, 374, 375, 377, 378, 359/434, 466, 471, 475, 477
See application file for complete search history.

(56) References Cited

U.S. PATENT DOCUMENTS 5,227,914 A 7/1993 Hanzawa et al. ........... 359/377
5,793,523 A * 8/1998 Twisselmann ............... 359/363
6,333,813 B1 * 12/2001 Morita et al. ............... 359/368
6,473,229 B1 10/2002 Nakamura .................. 359/377

FOREIGN PATENT DOCUMENTS

JP 56144410 A * 11/1981
JP 2001-208979 8/2001

* cited by examiner

*Primary Examiner*—Arnel C. Lavarias
(74) *Attorney, Agent, or Firm*—Arnold International; Bruce Y. Arnold

(57) ABSTRACT

A stereoscopic microscope is disclosed that includes an objective lens which substantially collimates light from an object of interest, left and right afocal zooming systems, left and right afocal relay systems, and an ocular tube optical system which forms magnified images of the object. The optical axis of the objective lens is substantially normal to a plane that includes the optical axes of the left and right afocal zooming systems, a beam splitter is arranged in each optical path between the left and right afocal zooming systems and said ocular tube optical system, and in each optical path between the left and right afocal zooming systems and the ocular tube optical system, there is at least one region between the beam splitter and the ocular tube optical system where the optical axes of light fluxes from an observation object point intersect. Preferably, there are additional regions of intersecting light.

16 Claims, 8 Drawing Sheets

STEREOSCOPIC MICROSCOPE

This application claims the benefit of priority of JP 2002-271962, the subject matter of which is hereby incorporated by reference.

BACKGROUND OF THE INVENTION

With stereoscopic microscopes and surgical microscopes, there is a desire to reduce the distance between the position where one peers into the stereoscopic microscope and the observation object. In addition, it must be possible to attach a photographic device to the microscope and to also provide an observation station for a secondary observer, such as a surgical assistant, to observe an observation object. Further, the lateral extension of the microscope—the width of the microscope as viewed from the position of the primary observer—is preferred to be minimal for the primary observer in order to make it easier for the primary observer to utilize tools, such as tweezers, for working on an object within the field of view.

In addition, features are desired such as a high zooming ratio and having a variable-working-distance objective lens which enables the focus position to be changed without changing the position of the microscope. However, these features usually increase the distance between where the observer peers into the microscope and the observation object. Stereoscopic microscopes of the prior art that provide these features adopt an arrangement wherein two optical axes of a zooming optical system define a plane that is orthogonal to the optical axis of an objective lens by folding a portion of the light flux that exits the objective lens, as is done in the stereoscopic microscope disclosed in Japanese Laid-Open Patent Application No. 2001-208979, in order to lower the position where the observer peers into the microscope.

When attaching a photographic device and also when making observations by a secondary observer possible using an afocal relay system, the number of optical paths increases, thereby increasing the volume required for the optical paths and the volume required by the microscope. In Japanese Laid-Open Patent Application No. 2001-208979, a method for attaching and removing a unit to/from a microscope body is disclosed whereby only the unit that is necessary at the time of use is attached, thereby reducing the volume needed. However, as is shown in FIG. 8 of the present application, this requires that the attached unit be switched each time the microscope is adjusted for a right, a left, or an opposing position of the secondary observer in relation to the primary observer. Such an arrangement consumes time and thus is inefficient. While leaving multiple units attached does not require the switching of a single attached unit, such a practice adds an extra extension to the microscope, which is troublesome.

BRIEF SUMMARY OF THE INVENTION

The present invention relates to a stereoscopic microscope, and especially to a stereoscopic surgical microscope that allows work to be easily performed on an object. More particularly, the present invention provides a stereoscopic microscope that is easy to operate, provides good observation quality and reduces the length of the optical system so that the stereoscopic microscope can be made more compact while maintaining a sufficient working distance beneath the microscope body.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
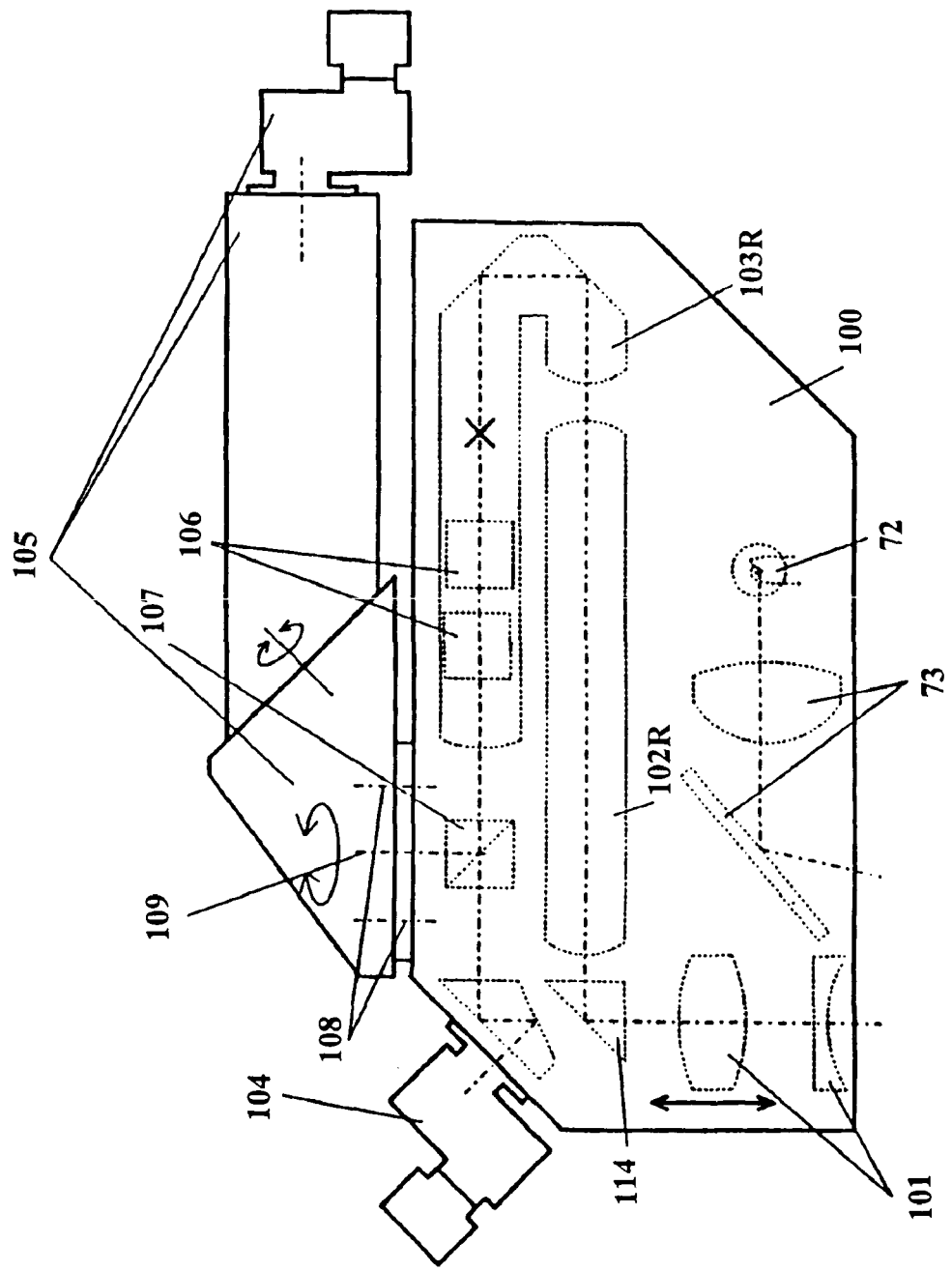
FIG. 1 shows the outline, as well as some of the components within, a stereoscopic microscope of the present invention as viewed from one side.
Figure 2:
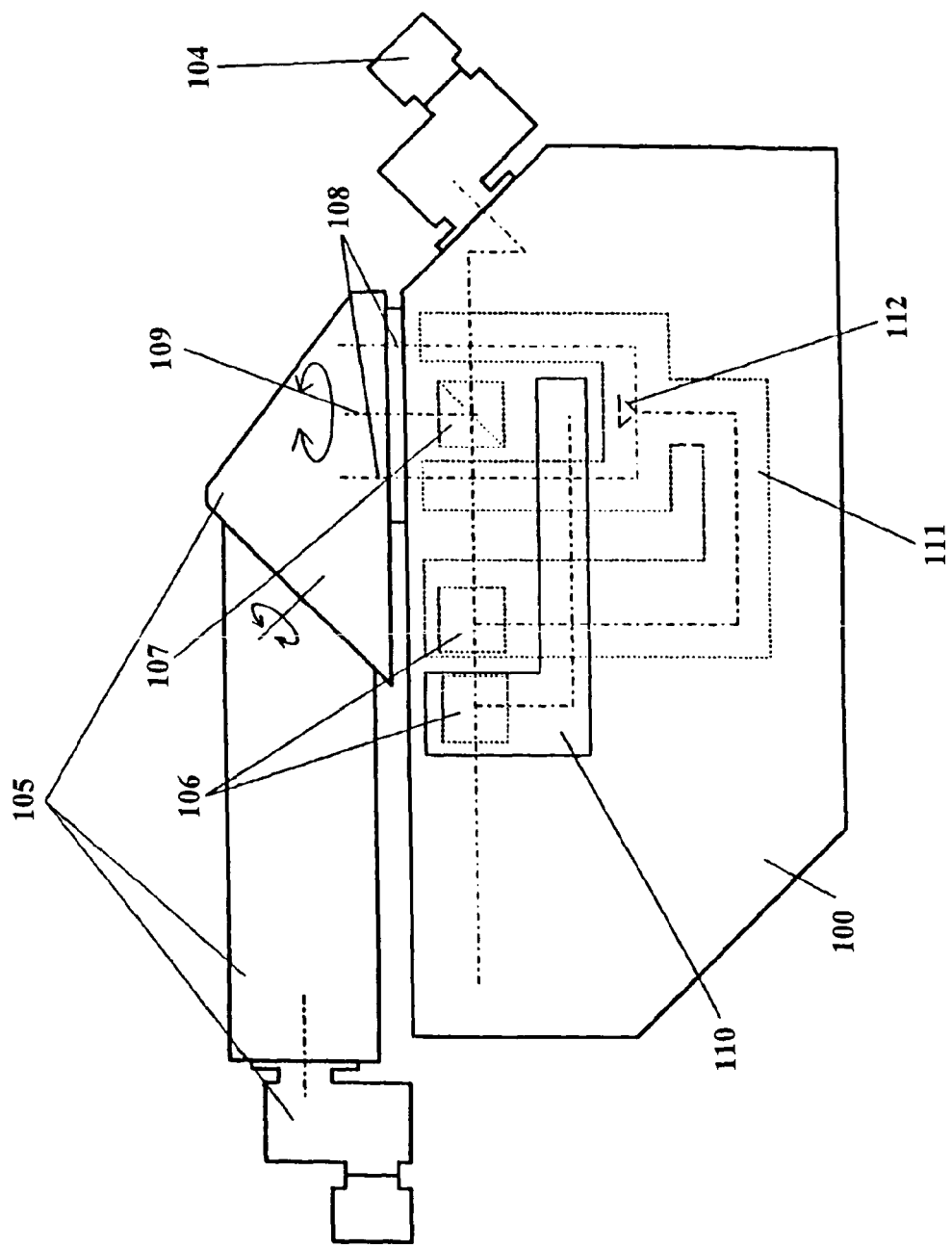
FIG. 2 shows the outline, as well as some of the components within, the stereoscopic microscope shown in FIG. 1 as viewed from the opposite side.

The construction of a stereoscopic microscope according to the present invention is shown in FIGS. 1 and 2. FIG. 1 illustrates the stereoscopic microscope as viewed from a position on the right side of a primary observer, and FIG. 2 illustrates the stereoscopic microscope as viewed from a position on the left side of the primary observer. In the description that follows, although the light paths for both eyes will be referred to, often only a particular item label for one eye path is visible in a given figure. An item that is not visible, by reason of being positioned behind an item that is visible in the drawing, will have its label listed within parentheses.

Referring to FIG. 1, a stereoscopic microscope is formed of a lens body housing 100 that may include: objective lens components 101 which collimate the light flux from an observation object point; left and right afocal zooming systems (102L) 102R; left and right afocal relay systems (103L) 103R, each of which forms a single internal image; a primary ocular tube optical system 104 that enables a primary observer using eyepiece lenses to view magnified images; and a secondary ocular tube optical system 105 that enables a secondary observer using eyepiece lenses to view magnified images. A reflecting member 114 is arranged so that the optical axis of the objective lens is orthogonal to a plane that includes the left and right optical axes of the afocal zooming systems (102L) 102R. Reflecting members are arranged within the afocal relay systems (103L) 103R for forming a single internal image in each afocal relay system, such as at the position X for the afocal relay system 103R so that a central attachment position of the primary ocular tube optical system 104 onto the lens body housing 100 lies in the vicinity of (i.e.,—in the example—just beneath) the point where a line that extends from the optical axis of the objective lens intersects with the lens body housing 100.

A first beam splitter 106 and a second beam splitter 107 are arranged in each of the left and right optical paths for the primary observer between the afocal zooming systems (102L) 102R and the primary ocular tube optical system 104. The first beam splitter 106 that is positioned along the right optical path for the primary observer enables a portion of the light that otherwise would pass to the right eye of the primary observer to be extracted for use by the photographic system. The first beam splitter 106 that is positioned along the left optical path for the primary observer enables a portion of the light that otherwise would pass to the left eye of the primary observer to be extracted for use by the secondary observer. The directions of the two light fluxes that are reflected by the first beam splitters 106, 106 are identical, with no light being directed in the opposite direction. This enables an extension of the stereoscopic microscope in a direction to the right of the primary observer to be eliminated, thus allowing the right side of the observation apparatus relative to the primary observer to be free to accept the insertion of additional devices, such as ones for working on an object being observed. The second beam splitters (107), 107 split off light that otherwise would pass through to the eyes of the primary observer so as to enable a secondary observer to observe from a direction that is generally opposite to the viewing direction of the primary observer.

Figure 3:
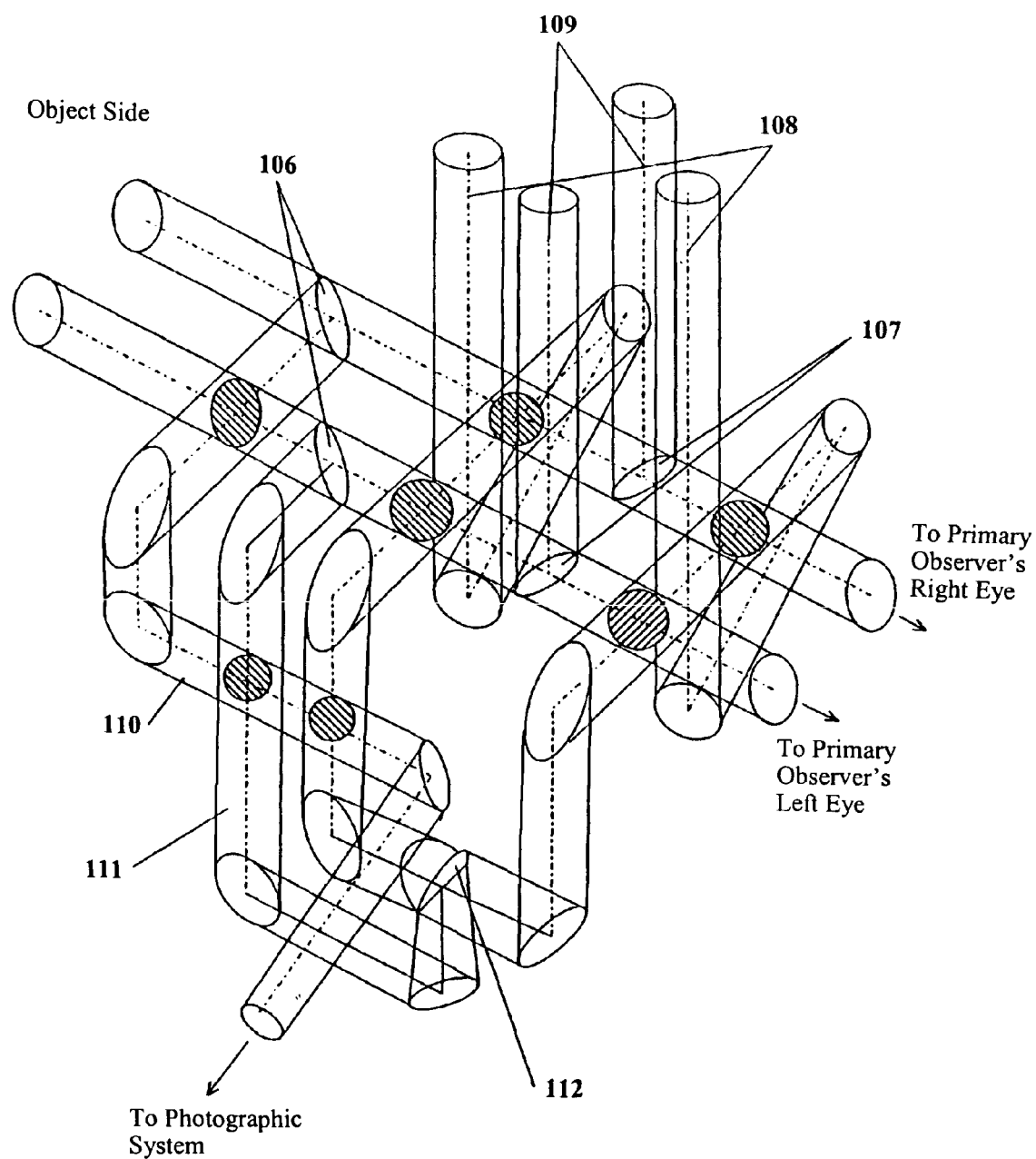
FIG. 3 shows one example of paths of light fluxes for the present invention, with the intersections of the light fluxes illustrated by cross-hatched areas.

Referring to FIG. 3, regions are provided where light fluxes that are transmitted to the primary observer by the first beam splitter 106 in each light path intersect with light fluxes that have been reflected by one of the first beam splitters 106. As used herein, light fluxes that "intersect" refer to light fluxes that meet and cross in a region. Light flux intersection regions are shown in FIG. 3 as shaded regions having cross-hatching. A region may also be provided where a light flux that is reflected by the first beam splitter 106 in one of the light paths intersects with the light flux in the other light path prior to the light flux in the other light path being incident onto the first beam splitter 106 in that other light path. Also, regions may be provided where light that has been reflected by a first beam splitter 106 in one light path intersects multiple times with light that has been reflected by a first beam splitter 106 in the other light path. The volume needed within the stereoscopic microscope of the present invention is reduced by having these light fluxes that intersect do so at multiple regions in space. The number of intersecting light flux regions should be at least two; however, the volume needed within the stereoscopic microscope of the present invention can be reduced to a greater extent when there are additional regions of intersecting light fluxes. Thus, at least five regions of intersecting light fluxes is more preferable in order to further reduce the volume. Furthermore, it is preferred that the optical axes of the light fluxes that intersect be orthogonal.

A construction which allows a secondary observer to switch his position to the left of, to the right of, or opposite a primary observer while having the secondary ocular tube optical system 105 attached in place to the stereoscopic microscope will now be discussed.

Referring to FIG. 1, a first beam splitter 106 and a second beam splitter 107 are arranged between the afocal zooming system 102R and the primary ocular tube optical system 104. Also, a first beam splitter 106 and a second beam splitter (107) are arranged between the afocal zooming system (102L) and the primary ocular tube optical system 104. Because the first beam splitters 106, 106 are arranged at different axial positions within their respective light paths, both first beam splitters are visible in FIGS. 1 and 2. As shown in FIGS. 2 and 3, with the first beam splitters 106, 106 optical paths are split for a photographic system optical path 110 (derived from light in one of the light paths that otherwise would be transmitted to the primary observer) and a lateral observation optical path 111 (derived from light in the other light path that otherwise would be transmitted to the primary observer).

As shown in FIG. 3, the lateral observation optical path 111 is split by a pupil splitter 112 so that a secondary observer can observe from a position that is located, for example, on the left side of the primary observer by peering along the optical axes 108, 108. By operation of the second beam splitters 107, 107 (FIG. 3), light paths are split off from light that otherwise would proceed to the eyes of the primary observer. This light enables the secondary observer to observe in a direction that is generally opposite to the viewing direction of the primary observer.

The pupil splitter 112 is arranged within the lateral observation optical path 111, and the pupil of the afocal zooming system 102R is relayed to the pupil splitter 112. By the pupil splitter 112 splitting the light flux within the afocal zooming system 102R, and because these split light fluxes have somewhat less parallax than that presented to the primary observer, the secondary observer is able to view a stereoscopic image from lateral positions with less parallax than the images observed by the primary observer or by the secondary observer when viewing in a direction that is generally opposite to that of the primary observer.

Figure 4:
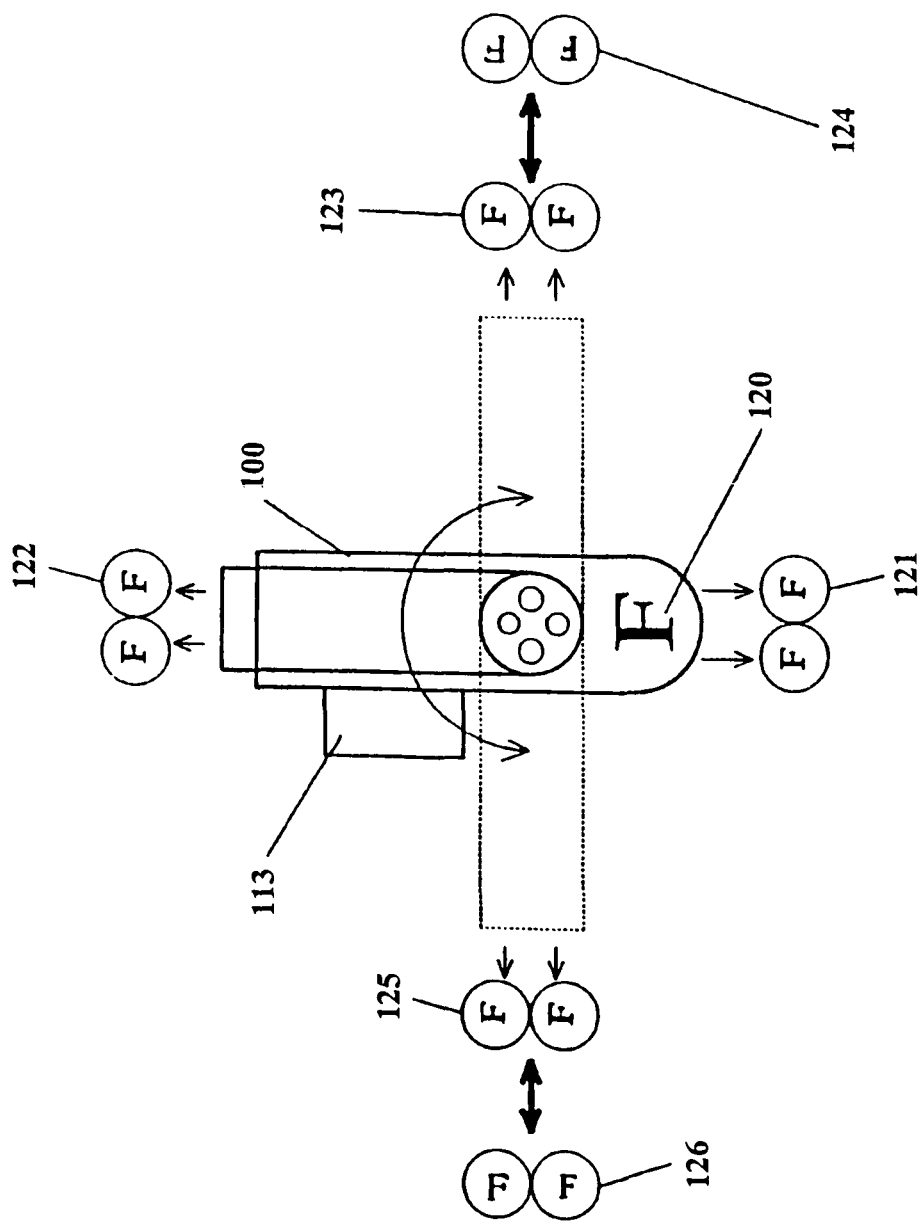
FIG. 4 shows the orientation of images presented for observation to a primary and secondary observer at different observation positions of the stereoscopic microscope of the present invention.

On the other hand, the photographic system optical path 110 provides images that are not stereoscopic. In addition, a plane that includes the lateral (left and right) optical axes 108 (FIG. 3) and a plane that includes the opposing direction optical axes 109 of the light fluxes for observation by the secondary observer that are reflected by the second beam splitters 107 are arranged so as to cross orthogonally. The observing direction of the secondary observer can be switched by rotating the secondary ocular tube optical system 105 around a vertical axis that is centered within the optical axes 108 and 109. Furthermore, an image rotator (not shown in FIG. 3, but which may be similar in construction to item 81 shown in FIG. 7) is arranged on the object side of the pupil splitter 112. By rotation of the image rotator, the secondary observer can freely adjust the orientation of tile images which he or she observes. For example, the orientation of an observation object can be as if looking directly at the observation object from the position of the secondary observer, or it can be made to match the orientation as seen by the primary observer. FIG. 4, which is a top view of the microscope, illustrates this feature, with the position of the primary observer being the viewing position nearest the bottom of the drawing figure. In relation to the observation object F at object position 120, the orientation of the left and right eye images as seen by the primary observer at observation position 121 (as illustrated by the letters F shown within circles) is identical to that of tile orientation of the observation object itself. When the secondary observer observes the observation object from the observation positions 122, 123 and 125, the direct view images will have an orientation as illustrated by the orientation of the Fs within circles at the respective positions 122, 123 and 125. The secondary observer may then adjust the orientation of these images as desired by rotating the image rotator. By making the orientation of the images for the secondary observer at positions 123 or 125 (as illustrated by the orientations of the Fs labeled 124 and 126, respectively) the same as the orientation images as seen by the primary observer at observation position 121, technical instructions from the primary observer to the secondary observer, and vice-versa, are more easily related.

In the present invention, a single intermediate image is created in each (left and right) light path of the afocal relay systems, and the images are inverted by the relay systems. To obtain erected normal images, the observation optical system within the microscope body includes reflecting members. These reflecting members reflect the left and right light fluxes an odd number of times both in the plane that is orthogonal to the optical axis of the objective lens and in the plane that includes the center line between the optical axes of the left and right afocal zooming systems and the optical axis of the objective lens. By constructing the microscope body in this manner, an observation tube usable with a microscope body that includes a relay lens that forms no intermediate image, or with a microscope body that includes no relay lens, can be used as a primary observation tube in this invention.

Moreover, the secondary ocular tube optical system 105 is rotatable about a line centered between optical axes of the left and right light fluxes in the secondary ocular tube optical system 105 so as to allow the secondary observer to change the observation direction somewhat from the predetermined positions shown in FIG. 4, that is, the positions 123 (90 degrees), 122 (180 degrees) and 125 (270 degrees). However, doing this causes some eclipsing of the light flux and thus a reduction in the peripheral light of the observed image. In the present invention, a construction is provided wherein the number of reflections from the object to the rotation axis of the secondary ocular tube optical system 105 is an even number. This makes for easier operability because the orientation of the viewed images will automatically be the same as if the observation object were seen from the rotated position of the secondary ocular tube optical system 105.

As seen in FIG. 1, the light source 72 as well as the illumination optical system 73 can be positioned within the lens body housing 100. Alternatively, a light guide may be used within the lens body housing 100 so that light from a light source that is located outside the lens body housing 100 is conveyed into the housing. In this way, an increase in temperature of the lens body housing 100 due to heat generated by having the lamp within the housing can be reduced. Also, a photographic device can be attached to the arm 113 (FIG. 4) with the photographic device being separated from the observation position.

Furthermore, in order to avoid interference between the arm 113 and the secondary ocular tube optical system 105, it is preferable that the secondary ocular tube optical system 105 be constructed with three parts connected in series, each two adjacent parts of which are rotatable relative to each other. This allows for switching of the observation direction without interfering with the arm 113.

Various embodiments of a stereoscopic microscope of the present invention will now be described in detail with reference to the drawings.

Embodiment 1

Figure 5:
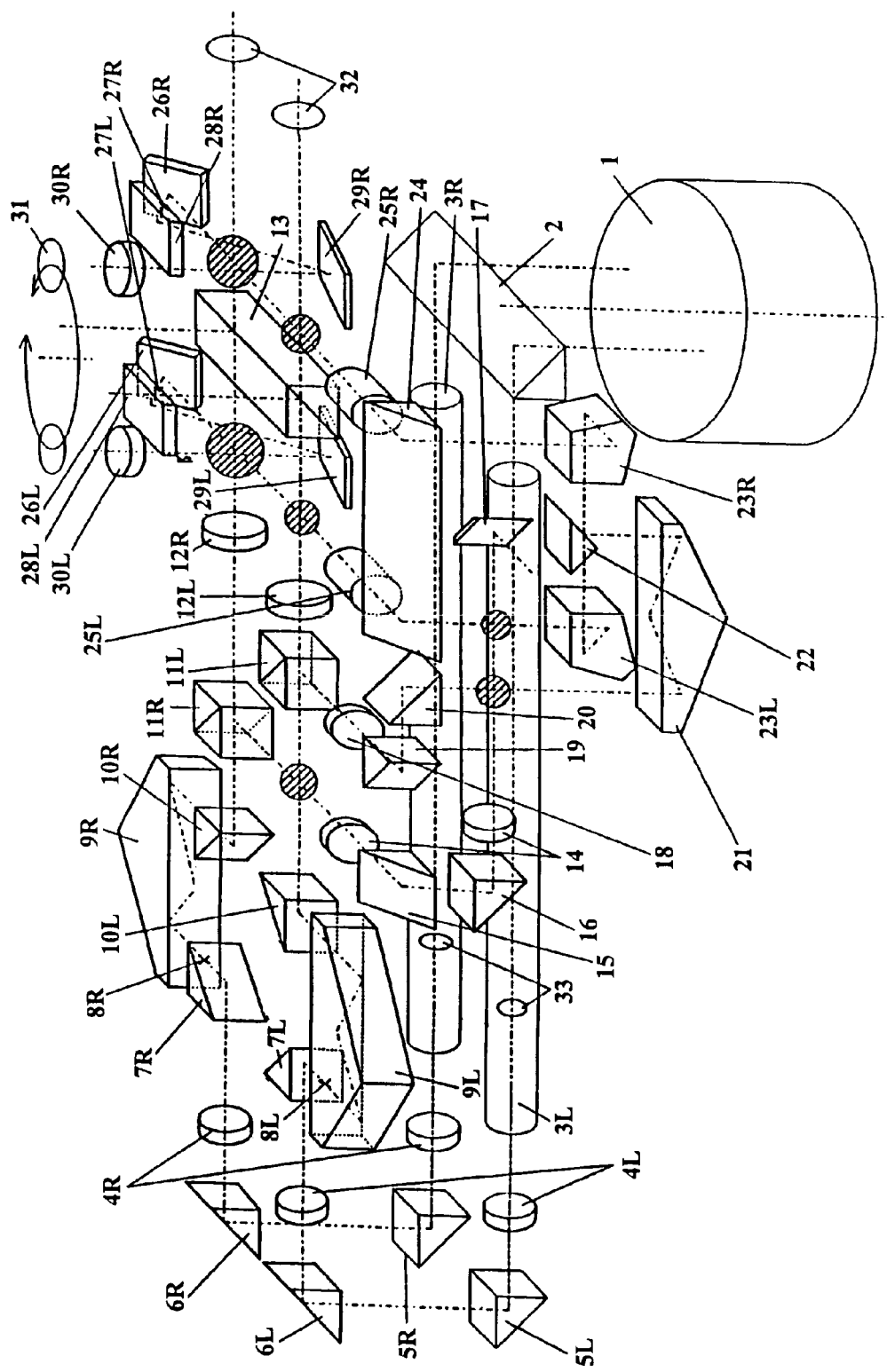
FIG. 5 shows the optical system according to Embodiment 1.

The optical system of Embodiment 1 is shown in FIG. 5. An objective lens 1 is provided which collimates the light flux from the focus position of the observation object. A reflecting member 2 is also provided for reflecting in an orthogonal direction to the optical axis of the objective lens the light flux that exits from the objective lens 1. For the objective lens 1, an objective lens can be substituted which has the ability to change the working distance by moving interior components of the lens without moving the microscope. A plurality of reflecting members may also be used as the reflecting member 2. The light flux that is reflected by the reflecting member 2 enters into left and right afocal zooming systems 3L and 3R, respectively, and is output as substantially collimated light beams of a selected magnification. (It should be noted that the L and R following the reference number 3 are used to indicate the left and right optical systems, and thus are not limited to optical paths for the left and right eye, respectively.)

An image relay system that forms a single intermediate image for each light flux is comprised of relay system image formation lenses 4L and 4R and the relay system collimator lenses 12L and 12R. The substantially collimated light beams which exit from the afocal zooming systems 3L and 3R are imaged at the image formation points 8L and 8R by the relay system image formation lenses 4L, 4L and 4R, 4R. The imaged light flux is output as substantially collimated light beams by the relay system collimator lenses 12L and 12R. The pupils 33, 33 of the afocal zooming systems 3L and 3R are relayed by the image relay system so as to be nearby the pupil of the primary ocular tube optical system.

The reflecting members 5L and 5R, 6L and 6R, 7L and 7R, the three-times reflecting members 9L and 9R (where, in each, the optical axis forms an "M" shape due to the three reflections) and the reflecting members 10L and 10R are all positioned between the relay system image formation lenses 4L, 4L and 4R, 4R and the relay system collimator lenses 12L, and 12R. The image formation points 8L and 8R are positioned between the reflecting members 7L and 7R and the three-times reflecting members 9L and 9R so that dust that adheres to the optical system will not be noticed. For this reason, it is best that mirrors are used for the reflecting members 7L and 7R.

Furthermore, since the incident optical axes and exit optical axes of the three-times reflecting members 9L and 9R are parallel, the spacing for the left and right incident optical axes to the reflecting members 7L and 7R can be changed with the spacing for the left and right reflected optical axes at the reflecting members 10L and 10R. When the objective lens 1 is formed of, in order from the object side, a negative lens group and a positive lens group, and when the working distance is to be changed by moving either one of these lens groups, the three dimensional effect is reduced in relation to the same working distance of an objective lens made from a single lens. In this situation, the three dimensional effect can be increased by spreading the optical axis spacing on the object side without changing the optical axis spacing of the ocular tube optical system.

The left and right light fluxes reflected by the reflecting members 10L and 10R are each split by the beam splitting members 11L and 11R. A photographic system is arranged at the reflection side of the beam splitting member 1R, and an observation system is arranged for lateral use by the secondary observer at the reflection side of the beam splitting member 11L.

A beam splitting member 13 is arranged at the output side of relay system collimator lenses 12L and 12R with the latter being arranged at the transmission side of the beam splitting members 11L and 11R. The light flux on the reflection side of this beam splitting member 13 is used in order for the secondary observer to observe in a direction opposite to that of the primary observer.

A primary ocular tube optical system is arranged at the transmission side of the beam splitting member 13 and receives light via openings 32 in the lens body housing. An attachment surface of the ocular tube may be attached orthogonally. However, the attachment surface may be attached at a 45° angle or horizontally. When attaching the attachment surface of the ocular tube at a 45° angle or horizontally, it is best to use a 45° angle twice reflecting prism or a penta prism, respectively.

In the primary observation system, the number of reflections in each plane parallel with a plane defined by the optical axis of the objective lens 1 and the center lines of the optical axes of the left and right pair of afocal zooming systems 3L and 3R is an odd number, since reflections occur at the reflecting member 2, the reflecting members 5L and 5R, and the reflecting members 6L and 6R. On the other hand, the number of reflections in the planes that are orthogonal to the above planes is also an odd number, since a total of 5 reflections occurs in each optical path at the reflecting members 7L and 7R, the three-times reflecting members 9L and 9R, and the reflecting members 10L and 10R. The image is flipped by way of this reflecting member construction. Accordingly, the image is restored to its original orientation by the relay lens forming a single intermediate image.

The beam splitting member 11R is arranged so that the optical axis of the light flux reflected by the beam splitting member 11R orthogonally intersects with the optical axis of the left eye optical path. Similarly, the beam splitting member 11L is arranged so that the optical axis of the light flux reflected by the beam splitting member 11R is parallel to the light reflected by beam spitting member 11L. Such a construction reduces the extension of the microscope to the right of the primary observer. This is desirable because the majority of people are right handed.

The light flux reflected by the beam splitting member 11R is made substantially collimated by the photographic system collimator lens 14 after intersecting with the light flux in the left eye optical path for the primary observer. The pupil 33 of the afocal zooming system 3R is relayed to the pupil of the photographic system (not shown) by the image relay system. In addition, the distance is adjusted by the reflecting members 15, 16, and 17. The photographic system collimator lens 14 is formed of two lens groups that are separated, with one of the lens groups being used to adjust the focal point distance to infinity by moving along the direction of the optical axis, and with the other lens group being able to adjust the image center by movement in a direction orthogonal to the optical axis.

A lateral collimator lens 18 is arranged at the reflection side of the reflecting member 11L. It outputs a substantially collimated beam and relays the pupil 33 of the afocal zooming system 3L to the pupil splitting prism 22. The distance to the pupil position, the number of reflections, and the left and right directions for a three dimensional view are adjusted by the reflecting members 19 and 20, as well as by the three-times reflecting prism 21. The light flux that is split by the pupil splitting prism 22 is imaged at the pupil splitting relay image formation points 27L and 27R by way of the pupil splitting relay image formation lenses 25L and 25R, and the light flux from the object is substantially collimated by the pupil splitting relay collimator lenses 30L and 30R. It is preferred that the split pupils are relayed to the same plane near the position where the pupils 33 of the afocal zooming systems 3L and 3R are relayed to the reflection side of the light splitter member 13. Pentagonal prisms 23L and 23R, and reflecting members 24, 26L and 26R, 28L and 28R, and 29L and 29R are arranged for matching the image orientation and the optical path length.

In the construction described above, a different image, in terms of the observation direction, can be observed by the secondary observer by rotating the opening 31 of the secondary ocular tube optical system centrally around a center line of the pupil splitting relay collimator lenses 30L and 30R that are aligned with the center line of the left and right optical axes on the reflection side of the beam splitting member 13.

In the secondary observation system, the number of reflections totals an odd number and the image orientation may be matched to the direction that the secondary observer directly views the observation object. The ocular tube for adjusting the position of the secondary observer extends and contracts, and a construction for further ease of use is provided such that the ocular tube rotates centrally around a center line that is positioned between the left and right optical axes so as to correct tilting of one's head.

In addition, there are many relay systems in the construction described above, and thus the construction requires a considerable volume. However, because the light fluxes are made to intersect in multiple regions, the volume needed is reduced, thus enabling the microscope to be smaller in size. The multiple regions are:

a region of intersection of a light flux between the beam splitting member 11R and the photographic system collimator lens 14, and a light flux between the reflecting member 10L and the beam splitting member 11L;

a region of intersection of a light flux between the photographic system collimator lens 14 and the reflecting member 17, and a light flux between the reflecting member 20 and the three-times reflecting prism 21;

a region of intersection of a light flux between the photographic system collimator lens 14 and the reflecting member 17, and a light flux between the penta prism 23L and the reflecting member 24;

a region of intersection of a light flux between the pupil splitting relay image formation lenses 25L, 25R and reflecting members 26L, 26R, and an exit light flux of the relay collimator lenses 12L, 12R; and a region of intersection of a light flux between the reflecting members 28L, 28R and reflecting members 29L, 29R, and an exit light flux of the relay collimator lens 12R.

Table 1 below lists the surface number #, the radius of curvature R of each surface, the on-axis spacing D between surfaces, as well as the index of refraction $N_d$ and the Abbe number $v_d$ (both measured relative to the d-line) of the relay system. When there is a difference in a surface separation D between the left eye and right eye optical paths, the surface separation for the right eye optical path is given in parentheses following the surface separation listing for the left eye optical path.

TABLE 1

| # | R | D | $N_d$ | $v_d$ |
|---|---|---|---|---|
| 1 | 69.2 | 3.2 | 1.51633 | 64.1 |
| 2 | −32.31 | 1.9 | 1.6668 | 33.1 |
| 3 | −76.95 | 9.9 | | |
| 4 | ∞ (reflector) | 39 | | |
| 5 | ∞ (reflector) | 10.7 | | |
| 6 | 215.37 | 2 | 1.51633 | 64.1 |
| 7 | ∞ | 12.3 | | |
| 8 | ∞ (reflector) | 11.4 | | |
| 9 | imaging point | 3 | | |
| 10 | ∞ | 33.8 | 1.51633 | 64.1 |
| 11 | ∞ | 5.9 | | |
| 12 | ∞ | 18 | 1.60342 | 38 |
| 13 | ∞ | 21.3 (1.3) | | |

TABLE 1-continued

| # | R | D | $N_d$ | $v_d$ |
|---|---|---|---|---|
| 14 | ∞ | 18 | 1.51633 | 64.1 |
| 15 | ∞ | 3.5 (23.5) | | |
| 16 | ∞ | 2 | 1.6668 | 33.1 |
| 17 | 56.97 | 2.4 | 1.58913 | 61.1 |
| 18 | −93.34 | 0.2 | | |
| 19 | 143.54 | 2 | 1.51633 | 64.1 |
| 20 | −143.54 | 21 | | |
| 21 | ∞ | 18 | 1.51633 | 64.1 |
| 22 | ∞ | | | |

The reflecting members 5L and 5R, 6L and 6R, 7L and 7R are mirrors, and the reflecting points of the optical axis on these surfaces are indicated in Table 1 above as surfaces #4, #5 and #8. The three-times reflecting members 9L and 9R and the reflecting members 10L and 10R are prisms, and the surfaces listed are those of the incident surface and exit surface. The incident surface of the three-times reflecting members 9L and 9R is surface #10 and the exit surface is surface #11; the incident surface of the reflecting members 10L and 10R is surface #12, and the exit surface is surface #13. The incident surface of the beam splitting members 11L and 11R is surface #14. The incident surface of the beam splitting member 13 is surface #21, and the exit surface is surface #22. The pupils of the afocal zooming systems 3L and 3R are positioned 57.4 mm toward the object side from the surface #1 of the relay system. These pupils are relayed to a position that is 59.3 mm on the ocular tube optical system side from surface #22.

Table 2 below lists the surface number #, the radius of curvature R of each surface, the on-axis spacing D between surfaces, as well as the index of refraction $N_d$ and the Abbe number $v_d$ (both relative to the d-line) of the optical system on the reflected light side of the beam splitting member 11L.

TABLE 2

| # | R | D | $N_d$ | $v_d$ |
|---|---|---|---|---|
| 1 | ∞ | 10.1 | | |
| 2 | 103.09 | 2.1 | 1.71736 | 29.5 |
| 3 | 47.26 | 2.5 | 1.51633 | 64.1 |
| 4 | −109.67 | 0.7 | | |
| 5 | ∞ | 2.2 | 1.51633 | 64.1 |
| 6 | −127.07 | 3 | | |
| 7 | ∞ | 18 | 1.60342 | 38 |
| 8 | ∞ | 0.5 | | |
| 9 | ∞ | 18 | 1.60342 | 38 |
| 10 | ∞ | 334 | | |
| 11 | ∞ | 55.4 | 1.51633 | 64.1 |
| 12 | ∞ | 7.4 | | |
| 13 | Pupil splitting point | 9.8 | | |
| 14 | ∞ | 34.5 | 1.51633 | 64.1 |
| 15 | ∞ | 18.3 | | |
| 16 | ∞ | 18 | 1.51633 | 64.1 |
| 17 | ∞ | 1.1 | | |
| 18 | 104.06 | 1.9 | 1.83481 | 42.7 |
| 19 | ∞ | 0.2 | | |
| 20 | 33.27 | 3.8 | 1.72916 | 54.7 |
| 21 | −33.27 | 1.8 | 1.59551 | 39.2 |
| 22 | 21.59 | 4.2 | | |
| 23 | −18.56 | 1.8 | 1.59551 | 39.2 |
| 24 | ∞ | 3 | 1.788 | 47.4 |
| 25 | −26.33 | 0.2 | | |
| 26 | 104.06 | 1.9 | 1.83481 | 42.7 |
| 27 | ∞ | 46 | | |
| 28 | ∞ (reflector) | 13.1 | | |
| 29 | ∞ (reflector) | 28.2 | | |
| 30 | ∞ (reflector) | 22.8 | | |
| 31 | 65.78 | 1.8 | 1.6393 | 44.87 |

TABLE 2-continued

| # | R | D | $N_d$ | $v_d$ |
|---|---|---|---|---|
| 32 | 22.51 | 4.2 | 1.497 | 81.5 |
| 33 | −35.65 | | | |

The reflecting side exit surface of the beam splitting member 11L is surface #1, and the lateral collimator lens surfaces are surfaces #2 through #6. The incident surface of the reflecting member 19 is surface #7, the incident surface of the reflecting member 20 is surface #9, the incident surface of the three-times reflecting member 21 is surface #11, and the exit surfaces of each of these reflecting members are the following surfaces.

The splitting point of the pupil splitting prism 22 is surface #13. The incident surface of the penta prisms 23L and 23R is surface #14, the incident surface of the reflecting member 24 is surface #16 and the surface immediately following in each case is the exit surface. The pupil splitting relay image formation lenses 25L and 25R comprise the surfaces #18 through #27. The reflecting members 26L and 26R, 28L and 28R, 29L and 29R are mirrors, and the reflecting points of the optical axis are on the surfaces #28, #29, and #30, respectively. The pupil splitting relay collimator lenses 30L and 30R comprise the surfaces #31 through #33.

Embodiment 2

Figure 6:
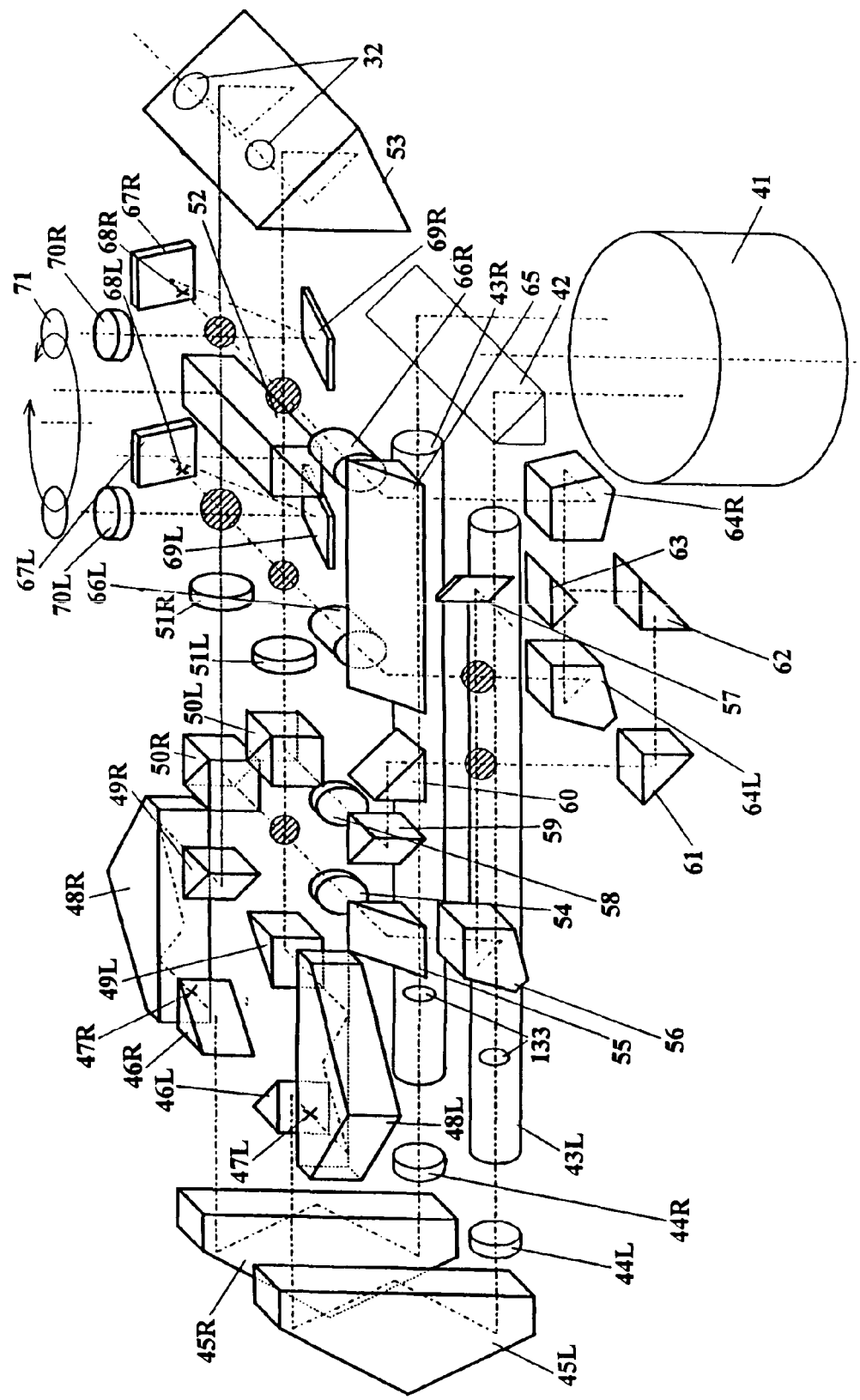
FIG. 6 shows the optical system according to Embodiment 2.

The optical system for Embodiment 2 is shown in FIG. 6. In Embodiment 1, lateral observation for a secondary observer who is positioned 90° in azimuth in relation to the viewing direction of the primary observer is acceptable. However, even a slight movement away from 90° makes the direction of orientation of the image different from that of the direct view image. This is because the number of reflections to reach the rotation axis portion of the secondary ocular tube optical system is an odd number. If the number of reflections to this point is an even number, the direction of the image does not change even if the secondary ocular tube optical system is rotated within a range where eclipsing occurs or to a position where an opposite direction light flux cannot enter. In this way, Embodiment 2 provides a method for increasing the freedom of positioning for the secondary observer.

First, a description of the composition of the primary observation system will be given. An objective lens 41 is provided for substantially collimating the light flux from an observation object, and a reflecting member 42 is provided for reflecting the exit light flux in a direction that is orthogonal to the optical axis of the objective lens 41. The light flux that is reflected by the reflecting member 42 enters into the left and right afocal zooming systems 43L and 43R, and after undergoing zooming, is output as a substantially collimated light flux. Up to this point, Embodiment 2 is identical to Embodiment 1.

The substantially collimated light fluxes that exit the afocal zooming systems 43L and 43R are imaged at the image formation points 47L and 47R by the relay image formation lenses 44L and 44R. These light fluxes are output as substantially collimated beams by the relay system collimator lenses 51L, 51R. The afocal relay system that forms a single intermediate image is comprised of the relay image formation lenses 44L, 44R and the relay system collimator lenses 51L, 51R. The pupils 133 of the afocal zooming systems 43L, 43R are relayed to near the pupils of the primary ocular tube optical system by way of this relay system.

The three-times reflecting members 45L and 45R, the reflecting members 46L and 46R, the three-times reflecting members 48L and 48R, the reflecting members 49L and 49R, and the beam splitting members 50L and 50R are all arranged between the relay image formation lenses 44L and 44R and the relay system collimator lenses 51L and 51R. The image formation points 47L and 47R are positioned between the reflecting members 46L and 46R and the three-times reflecting members 48L and 48R so that dust that adheres to the optical system will not be noticed. For this reason, it is best that mirrors are used for the reflecting members 46L and 46R.

Since the vicinity of the three-times reflecting members 48L and 48R has the same design as in Embodiment 1, the three dimensional effect can be similarly adjusted in this embodiment. Further, since the three-times reflecting members 45L and 45R have the same shape, the optical path length can be adjusted by moving the three-times reflecting members 45L and 45R in the optical axis direction of the incident or exiting light, and this allows simplification of the structure of the relay image formation lenses 44L and 44R, such as by using a single cemented lens for each of the relay image formation lenses 44L and 44R. In addition, a small scale composition can be achieved because the extension by way of the prism shape is reduced.

The left and right light fluxes that are reflected by the reflecting member 49L and 49R are each split by the beam splitting members 50L and 50R. A photographic system is arranged in the reflection side of the beam splitting member 50R, and an observation system is arranged for lateral use by the secondary observer at the reflection side of the beam splitting member 50L.

A beam splitting member 52 is arranged at the output side of the relay system collimator lenses 51L and 51R which are arranged at the transmission side of the beam splitting members 50L and 50R. The light flux on the reflection side of this beam splitting member 52 is used for the secondary observer to observe in an opposing direction to the viewing direction of the primary observer.

An ocular tube optical system and a three-times-reflecting member 53 are arranged at the transmission side of the beam splitting member 52. An attachment surface of the ocular tube is attached at a 45° angle and receives light via openings 32 in the lens body housing. Instead, the attachment surface may be attached orthogonally or horizontally. However, when attaching the attachment surface orthogonally it is best to use a right angle prism, and when attaching the attachment surface horizontally it is best to use a combination of a penta prism and a right angle prism.

As apparent from FIG. 6, in the primary observation system, the number of reflections undergone by light that is in the plane parallel to the plane that includes the optical axis of the objective lens 41 and the center line of the optical axes of the left and right pair of afocal zooming systems 43L and 43R is an odd number. In fact, this number is seven for each light path, since there are reflections at the reflecting member 42, the three-times reflecting members 45L and 45R, and the three-times reflecting member 53. The number of reflections in the primary optical system undergone by the light that is in the plane perpendicular to the plane that includes the optical axis of the objective lens 41 and the center line of the optical axes of the left and right pair of afocal zooming systems 43L and 43R is also an odd number. In fact, this number is five for each light path, since there are reflections at reflecting members 46L and 46R, the three-times reflecting members 48L and 48R, and the reflecting members 49L and 49R. Thus, the image is flipped by the primary optical system. Accordingly, the image is restored to its original orientation by forming a single intermediate image using a relay lens. Also, the number of reflections on the reflection side of the beam splitting member 50L is an even number (e.g., 10 times).

The beam splitting member 50R is arranged so that the optical axis of the light flux that is reflected by the beam splitting member 50R orthogonally intersects with the optical axis of the left eye optical path for the primary observer. This achieves the same efficacy as Embodiment 1.

The light flux reflected by the beam splitting member 50R is substantially collimated by the photographic system collimator lens 54 after intersecting with the light flux in the left eye optical path for the primary observer. The pupil of the afocal zooming system 43R is relayed to the pupil of the photographic system (not shown) by a relay system. In addition, the distance can be adjusted by moving the reflecting members 55, 56, and 57. As opposed to the situation in Embodiment 1, in Embodiment 2 the photographic system collimator lens 54 is not formed of separated lens components. This is because, when the overall focal length of the collimator lens is long, the refractive power of each of the separated lens components would be reduced, thereby decreasing the efficacy of adjustment. Thus, in the present embodiment, this lens is not formed of separated components and the focus and image center are respectively adjusted by moving a single lens component along the optical axis and in a direction orthogonal to the optical axis.

A lateral collimator lens 58 is arranged at the reflection side of the beam splitting member 50L. It outputs a substantially collimated light flux and relays the pupil 133 of the afocal zooming system 43L to the pupil splitting prism 63. The distance to the pupil position, the number of reflections, and the left and right directions for a three dimensional view are adjusted by the reflecting members 59, 60, 61, and 62. The light flux that is split by the pupil splitting prism 63 is imaged at the pupil splitting relay image formation points 68L and 68R by way of the pupil splitting relay image formation lenses 66L and 66R, and the light flux from the object is substantially collimated by the pupil splitting relay collimator lenses 70L and 70R. It is preferred that the split pupils are relayed to the same plane near to the position where the pupils 133 of the afocal zooming systems 43L and 43R are relayed (i.e., to the reflection side of the beam splitter member 52). Pentagonal prisms 64L and 64R, and reflecting members 65, 67L and 67R, and 69L and 69R are arranged for matching the image direction and the optical path length.

In the construction described above, a different image of the observation direction can be observed by the secondary observer by rotating the opening 71 of the secondary ocular tube optical system centrally around a center line of the pupil splitting relay collimator lenses 70L and 70R that match with the center line of the left and right optical axes of the reflection side of the beam splitting member 52.

In the secondary observation system, since the number of reflections in the light path to the opening 71 of the secondary ocular tube optical system is an even number for both the opposing direction and the lateral direction, the rotation and switching of the observation direction of the secondary ocular tube optical system can be achieved without a problem.

There are many relay systems in the construction described above and, considerable volume is required. However, because the light fluxes are made to intersect one another at multiple regions, the cubic volume needed becomes small despite the increased length of the optical path. This enables the overall size of the microscope to be small. The multiple regions are:

a region of intersection of the light flux between the beam splitting member 50R and the photographic system collimator lens 54, and the light flux between the reflecting member 49L and the beam splitting member 50L;

a region of intersection of the light flux between the photographic system penta prism 56 and the reflecting member 57, and the light flux between the reflecting member 60 and the reflecting member 61;

a region of intersection of the light flux between the photographic system penta prism 56 and the reflecting member 57, and the light flux between the penta prism 64L and the reflecting member 65; and a region of intersection of the light flux between the pupil splitting relay image formation lenses 66L, 66R and reflecting members 67L, 67R and the exit light flux of the relay collimator lenses 51L, 51R.

Table 3 below lists the surface number #, the radius of curvature R of each surface, the on-axis spacing D between surfaces, as well as the index of refraction $N_d$ and the Abbe number $v_d$ (both measured relative to the d-line) of the relay system. When there is a difference in a surface separation D between the left eye and right eye optical paths, the surface separation for the right eye optical path is given in parentheses following the surface separation for the left eye optical path.

TABLE 3

| # | R | D | $N_d$ | $v_d$ |
|---|---|---|---|---|
| 1 | 84.15 | 4 | 1.48749 | 70.2 |
| 2 | −23.09 | 2 | 1.57501 | 41.5 |
| 3 | −55.91 | 5 | | |
| 4 | ∞ | 67.6 | 1.51633 | 64.1 |
| 5 | ∞ | 20.7 | | |
| 6 | ∞ (reflector) | 10.5 | | |
| 7 | imaging point | 3.7 | | |
| 8 | ∞ | 30.3 | 1.51633 | 64.1 |
| 9 | ∞ | 5.1 | | |
| 10 | ∞ | 18 | 1.56883 | 56.4 |
| 11 | ∞ | 23.7 (1.3) | | |
| 12 | ∞ | 18 | 1.51633 | 64.1 |
| 13 | ∞ | 4.2 (26.6) | | |
| 14 | 74.31 | 2 | 1.56732 | 42.8 |
| 15 | 25.59 | 4 | 1.48749 | 70.2 |
| 16 | −62.56 | 21.9 | | |
| 17 | ∞ | 18 | 1.51633 | 64.1 |
| 18 | ∞ | 18 | | |
| 19 | ∞ | 48.7 | 1.51633 | 64.1 |
| 20 | ∞ | | | |

The relay system imaging lenses 44L and 44R are surfaces #1 through #3. The incident plane of the three-times reflecting members 45L and 45R is surface #4 and the exit plane is surface #5. The reflecting members 46L and 46R are mirrors, and the reflecting point of the optical axis is surface #6. The incident plane of the three-times reflecting members 48L and 48R is surface #8, the incident plane of the reflecting members 49L and 49R is surface #10, and each of the exit planes is the surface that follows the incident plane. The incident plane of the beam splitting members 50L and 50R is surface #12, the incident plane of the beam splitting member 52 is surface #17, and each of the exit planes is the surface that follows the incident plane. The relay system collimator lenses 51L and 51R are the surfaces #14 through #16. The incident plane of the three-times reflecting member 53 is surface #19 and the exit plane is surface #20.

The pupils of the afocal zooming systems 43L and 43R are positioned 65.6 mm to the object side from surface #1 of the aforementioned relay system, and which is relayed to a position that is 10.5 mm on the optical tube optical system side from surface #20.

Table 4 below lists the surface number #, the radius of curvature R of each surface, the on-axis spacing D between surfaces, as well as the index of refraction $N_d$ and the Abbe number $v_d$ (both measured relative to the d-line) of the relay system on the reflection side in the beam splitting member 50L.

TABLE 4

| # | R | D | $N_d$ | $v_d$ |
|---|---|---|---|---|
| 1 | ∞ | 8.7 | | |
| 2 | 61.1 | 2.3 | 1.6223 | 53.2 |
| 3 | 30.08 | 4.5 | 1.43875 | 95 |
| 4 | −58.07 | 5 | | |
| 5 | ∞ | 18 | 1.51633 | 64.1 |
| 6 | ∞ | 0.5 | | |
| 7 | ∞ | 18 | 1.51633 | 64.1 |
| 8 | ∞ | 41.8 | | |
| 9 | reflecting point | 26.6 | | |
| 10 | reflecting point | 14.3 | | |
| 11 | pupil splitting point | 9.8 | | |
| 12 | ∞ | 34.5 | 1.51633 | 64.1 |
| 13 | ∞ | 19.8 | | |
| 14 | ∞ | 18 | 1.51633 | 64.1 |
| 15 | ∞ | 4.8 | | |
| 16 | 30.76 | 3.9 | 1.48749 | 70.2 |
| 17 | −30.76 | 0.2 | | |
| 18 | 70.52 | 4 | 1.497 | 81.5 |
| 19 | −20.46 | 1.9 | 1.6968 | 55.5 |
| 20 | 102.56 | 3.2 | | |
| 21 | −25.62 | 2 | 1.57501 | 41.5 |
| 22 | −55.472 | 53 | | |
| 23 | reflecting point | 34.6 | | |
| 24 | reflecting point | 22.4 | | |
| 25 | 62.32 | 2 | 1.6393 | 44.9 |
| 26 | 24.47 | 4.6 | 1.43875 | 95 |
| 27 | −31.86 | | | |

The exit plane of the reflecting side of the beam splitting member 50L is surface #1, and the lateral collimator lens 58 comprises surfaces #2 through #4. The incident plane of the reflecting member 59 is surface #5, the incident plane of the reflecting member 60 is surface #7, and the exit plane of each reflecting member is the following surface, respectively. The reflecting members 61 and 62 are mirrors and the reflecting point of each of the optical axes is surface #9 and #10.

The splitting point of the pupil splitting prism 63 is surface #11. The incident plane of the penta prisms 64L and 64R is surface #12, and the incident plane of the reflecting member 65 is surface #14, with the following surface number being the exit surface for each, respectively. The pupil splitting relay image formation lenses 66L and 66R comprises surfaces #16 through #22. The reflecting members 67L, 67R and 69L, 69R are mirrors, and the reflection at these members occurs at surfaces #23 and #24, respectively.

In FIG. 6, the pupil splitting relay image formation points 68L and 68R are at positions 3.5 mm from the reflecting members 67L, 67R and on the same side as the pupil splitting relay image formation lenses 66L and 66R. The pupil splitting relay collimator lenses 70L and 70R are the surfaces #25 through #27.

Embodiment 3

Figure 7:
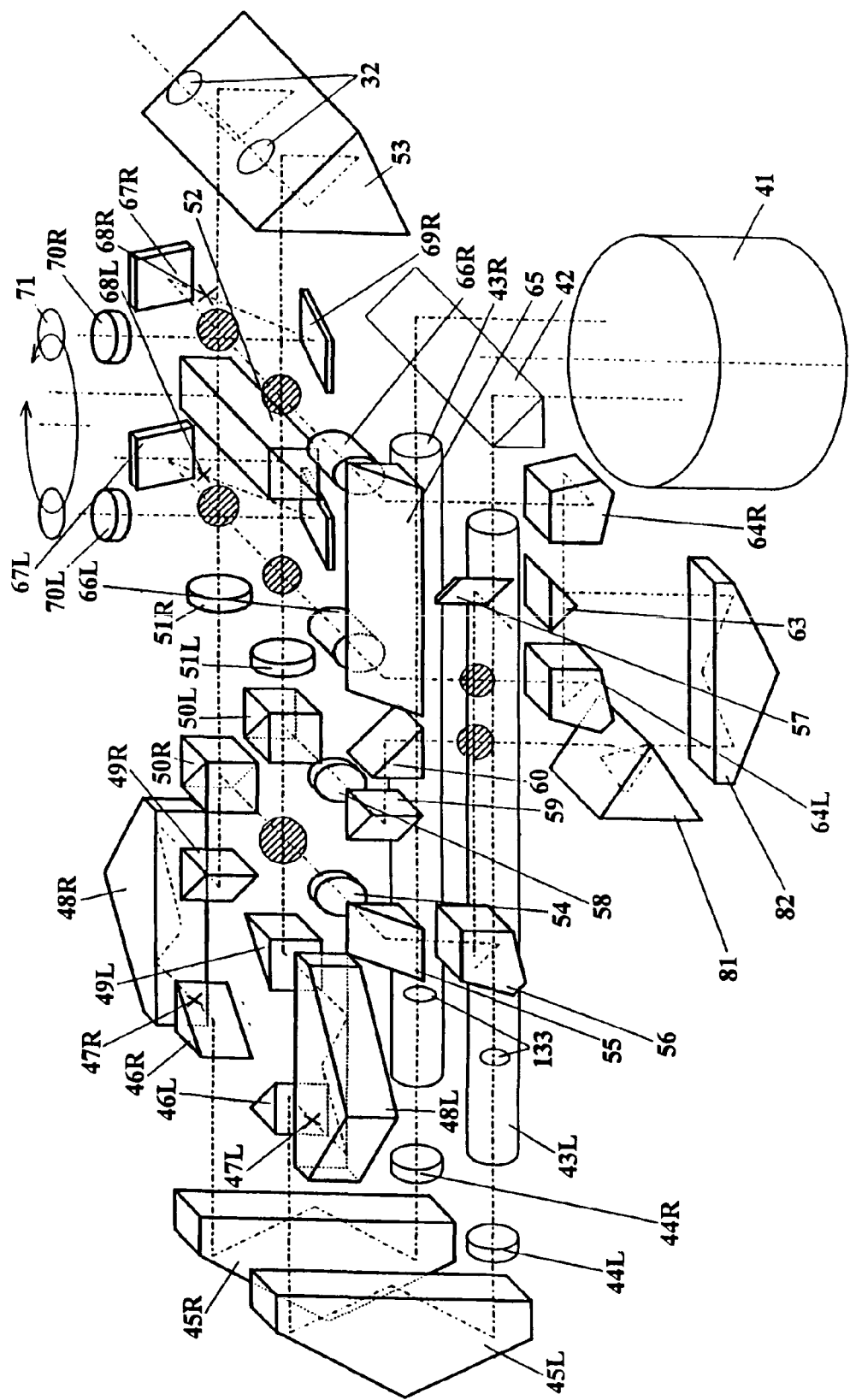
FIG. 7 shows the optical system according to Embodiment 3.
Figure 8:
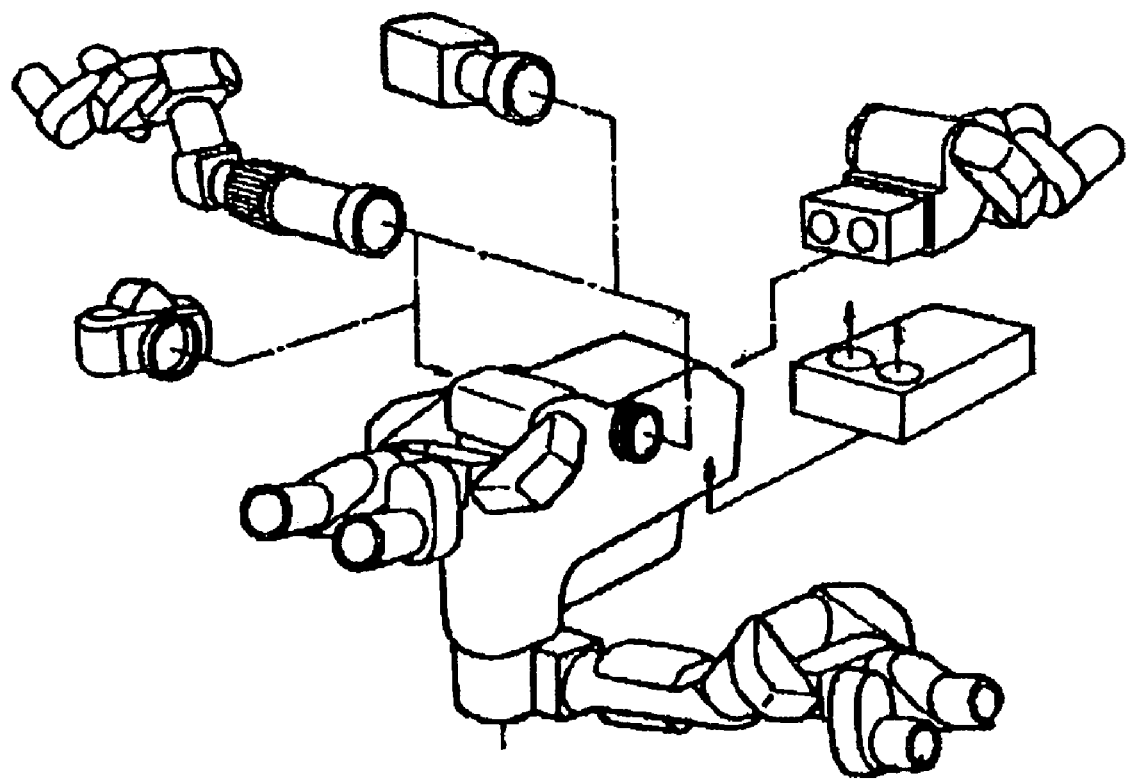
FIG. 8 is a perspective view of a stereoscopic microscope of the prior art.

The optical system of Embodiment 3 is shown in FIG. 7. In the construction of Embodiment 2, it is possible for the secondary observer to view an image having the same orientation as that observed by the primary observer. In this embodiment, the reflecting members 61 and 62 of the lateral optical system of Embodiment 2 are replaced by an arrangement of an image rotator 81 and a three-times reflecting member 82. This enables the orientation of the image as seen by the secondary observer to be freely changed by means of rotating the image rotator 81. In this way the secondary observer can change the orientation of the images viewed to any desired orientation.

The components shown in FIG. 7 that are identical to those of FIG. 5 are labeled with the same reference numerals and will not be further discussed. Since there are very few changed parts from Embodiment 2, this embodiment also can be formed of a single unit, thus enabling good exchangeability. However, since there is a large difference in the optical path lengths, in Embodiment 2 the effective optical path length is increased by using mirrors as the reflecting members of the exchangeable portion, while in Embodiment 3 the optical path length is made as short as possible by using prisms for the reflecting members of the exchangeable portion having a high refractive index. When there still remains a difference in the optical path length even after this, it can generally be tolerated if the difference in the left and right brightness at the image plane caused by the difference in pupil position does not cause problems in observation.

The invention being thus described, it will be obvious that the same may be varied in many ways. For example, rather than the light for the photographic optical system and for the secondary observer being split off from light that otherwise would proceed to the right and left eyes, respectively, of the primary observer, this light could be split off from light that otherwise would proceed to the left and right eyes, respectively, of the primary observer. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A stereoscopic microscope, comprising:
an objective lens, having an optical axis, which causes a light flux from an observation object point to be substantially collimated;
left and right afocal zooming systems, each having an optical axis and each receiving the substantially collimated light from the objective lens;
left and right afocal relay systems which receive light from the left and right afocal zooming systems, respectively;
an ocular tube optical system which receives light from the left and right afocal relay systems and forms magnified images using an eyepiece lens in each of said left and right afocal light fluxes received from the left and right afocal relay systems; and
at least one beam splitter that is arranged in each optical path between said left and right afocal zooming systems and said ocular tube optical system;
wherein
the objective lens, the left and right afocal zooming systems, the left and right afocal relay systems, and the at least one beam splitter are accommodated in a housing of the stereoscopic microscope;
each of the beam splitters that are arranged in the left optical path and in the right optical path splits off a light flux by reflection, and two light fluxes that are split off by the beam splitters have optical axes that are substantially parallel;
at least two regions are provided in the housing where portions of two light fluxes intersect; and
the portions of two light fluxes that intersect include the optical axes of said two light fluxes that are split off.

2. A stereoscopic microscope, comprising:
an objective lens, having an optical axis, which causes a light flux from an observation object point to be substantially collimated;
left and right afocal zooming systems, each having an optical axis and each receiving the substantially collimated light from the objective lens;
left and right afocal relay systems which receive light from the left and right afocal zooming systems, respectively;
an ocular tube optical system which receives light from the left and right afocal relay systems and forms magnified images using an eyepiece lens in each of said left and right afocal light fluxes received from the left and right afocal relay systems; and
at least one beam splitter that is arranged in each optical path between said left and right afocal zooming systems and said ocular tube optical system;
wherein
the objective lens, the left and right afocal zooming systems, the left and right afocal relay systems, and the at least one beam splitter are accommodated in a housing of the stereoscopic microscope;
at least two regions are provided in the housing where portions of two light fluxes intersect;
the portions of two light fluxes that intersect include the optical axes of said two light fluxes;
the at least one beam splitter includes a first beam splitter that is arranged in at least one of the light paths of the left and right afocal zooming systems and the ocular tube optical system, and a second beam splitter that is arranged in each light path between the left and right afocal zooming system and the ocular tube optical system;
the first beam splitter splits off observation light from light that otherwise would be viewed by the primary observer into a light path for observation by a secondary observer, which light path is not in line with the observation light paths of the primary observer, so that a secondary observer can observe in a direction that is generally lateral to the direction in which the primary observer observes an observation object; and
the second beam splitter splits off observation light from light that otherwise would be viewed by the primary observer so that a secondary observer can observe in a direction that is generally opposite to the direction in which the primary observer observes an observation object;
a pupil splitter is positioned in an optical path for observation by a secondary observer;
a pupil of one of the afocal zooming systems is relayed to the pupil splitter:
an ocular tube for use by a secondary observer is provided; and
left and right light fluxes that are separated by the pupil splitter and said left and right light fluxes that are split off by the second beam splitters enter the ocular tube for use by the secondary observer.

3. The stereoscopic microscopic according to claim 2, wherein:
at the entrance opening of the ocular tube for the secondary observer, a line centered between the optical axes of the left and right light fluxes split by the pupil splitter is co-linear with a line centered between the optical axes of the left and right light fluxes that have been split by the second beam splitters; and
the observation direction of the secondary observer can be changed by rotating the ocular tube for the secondary observer around the lines that are co-linear.

4. The stereoscopic microscope according to claim 3, and further including an image rotator that is positioned on the object side of the pupil splitter and is adjustable by being rotated so that the rotational orientation of images observed by the secondary observer may be adjusted.

5. The stereoscopic microscope according to claim 3, wherein:
at the point where light from an object enters the ocular tube optical system used by the primary observer, the number of reflections of the light flux within a first plane orthogonal to the optical axis of the objective lens is an odd number, and the number of reflections within a second plane that is a plane that includes the center line between the optical axis of the left and right pair of afocal zooming systems and the optical axis of the objective lens is an odd number; and
a plurality of reflection surfaces are provided in the observation system used by the secondary observer, with the number of reflections of the light flux from the object to the rotation axis part of the secondary observer ocular tube being an even number.

6. The stereoscopic microscope according to claim 2, wherein:
a region is also provided where a light flux that is reflected by a beam splitter in one light path that otherwise would pass to a primary observer intersects with a second light flux.

7. The stereoscopic microscope according to claim 6, wherein:
two additional regions are provided where light that has been reflected by a beam splitter in one light path that otherwise passes light to one eye of a primary observer intersects with light that has been reflected by a beam splitter in another light path that otherwise passes light to a different eye of the primary observer.

8. The stereoscopic microscope according to claim 2, wherein:
in each said optical path between said left and right afocal zooming systems and said ocular tube optical system, there are two regions between said beam splitter and the ocular tube optical system where the optical axes of light fluxes from an observation object point intersect.

9. The stereoscopic microscope according to claim 8, wherein:
a region is also provided where a light flux that is reflected by a beam splitter in one light path that otherwise would pass to a primary observer intersects with a second light flux.

10. The stereoscopic microscope according to claim 9, wherein:
two additional regions are provided where light that has been reflected by a beam splitter in one light path that otherwise passes light to one eye of a primary observer intersects with light that has been reflected by a beam splitter in another light path that otherwise passes light to a different eye of the primary observer.

11. The stereoscopic microscope according to claim 2, wherein:
the optical axis of the objective lens is substantially normal to a plane that includes the optical axes of the left and right afocal zooming systems; and
in each said optical path between said left and right afocal zooming systems and said ocular tube optical system, there is at least one region between said at least one beam splitter and the ocular tube optical system where the optical axes of light fluxes from an observation object point intersect.

12. A stereoscopic microscope, comprising:
an objective lens, having an optical axis, which causes a light flux from an observation object point to be substantially collimated;
left and right afocal zooming systems, each having an optical axis and each receiving the substantially collimated light from the objective lens;
left and right afocal relay systems which receive light from the left and right afocal zooming systems, respectively;
an ocular tube optical system which receives light from the left and right afocal relay systems and forms magnified images using an eyepiece lens in each of said left and right afocal light fluxes received from the left and right afocal relay systems; and
at least one beam splitter that is arranged in each optical path between said left and right afocal zooming systems and said ocular tube optical system;
wherein
the objective lens, the left and right afocal zooming systems, the left and right afocal relay systems, and the at least one beam splitter are accommodated in a housing of the stereoscopic microscope;
at least two regions are provided in the housing where portions of two light fluxes intersect;
the at least one beam splitter includes a first beam splitter that is arranged in at least one of the light paths of the left and right afocal zooming systems and the ocular tube optical system, and a second beam splitter that is arranged in each light path between the left and right afocal zooming system and the ocular tube optical system;
the first beam splitter splits off observation light from light that otherwise would be viewed by the primary observer into a light path for observation by a secondary observer, which light path is not in line with the observation light paths of the primary observer, so that a secondary observer can observe in a direction that is generally lateral to the direction in which the primary observer observes an observation object;
the second beam splitter splits off observation light from light that otherwise would be viewed by the primary observer so that a secondary observer can observe in a direction that is generally opposite to the direction in which the primary observer observes an observation object;
a pupil splitter is positioned in an optical path for observation by a secondary observer;
a pupil of one of the afocal zooming systems is relayed to the pupil splitter;
an ocular tube for use by a secondary observer is provided;
left and right light fluxes that are separated by the pupil splitter and said left and right light fluxes that are split off by the second beam splitters enter the ocular tube for use by the secondary observer;

at the entrance opening of the ocular tube for the secondary observer, a line centered between the optical axes of the left and right light fluxes split by the pupil splitter is co-linear with a line centered between the optical axes of the left and right light fluxes that have been split by the second beam splitters; and the observation direction of the secondary observer can be changed by rotating the ocular tube for the secondary observer around the lines that are co-linear.

13. The stereoscopic microscope according to claim 12, and further including an image rotator that is positioned on the object side of the pupil splitter and is adjustable by being rotated so that the rotational orientation of images observed by the secondary observer may be adjusted.

14. The stereoscopic microscope according to claim 12, wherein:

at the point where light from an object enters the ocular tube optical system used by the primary observer, the number of reflections of the light flux within a first plane that is a plane orthogonal to the optical axis of the objective lens is an odd number, and the number of reflections within a second plane that is a plane that includes the center line between the optical axis of the left and right pair of afocal zooming systems and the optical axis of the objective lens is an odd number; and a plurality of reflection surfaces are provided in the observation system used by the secondary observer, with the number of reflections of the light flux from the object to the rotation axis part of the secondary observer ocular tube being an even number.

15. A stereoscopic microscope, comprising:

an objective lens, having an optical axis, which causes a light flux from an observation object point to be substantially collimated;

left and right afocal zooming systems, each having an optical axis and each receiving the substantially collimated light from the objective lens;

left and right afocal relay systems which receive light from the left and right afocal zooming systems, respectively;

an ocular tube optical system which receives light from the left and right afocal relay systems and forms magnified images using an eyepiece lens in each of said left and right afocal light fluxes received from the left and right afocal relay systems; and at least one beam splitter that is arranged in each optical path between said left and right afocal zooming systems and said ocular tube optical system;

wherein the objective lens, the left and right afocal zooming systems, the left and right afocal relay systems, and the at least one beam splitter are accommodated in a housing of the stereoscopic microscope;

a region is also provided where a light flux that is reflected by a beam splitter in one light path that otherwise would pass to a primary observer intersects with a second light flux;

two additional regions are provided where light that has been reflected by a beam splitter in one light path that otherwise passes light to one eye of a primary observer intersects with light that has been reflected by a beam splitter in another light path that otherwise passes light to a different eye of the primary observer; and at least two regions are provided in the housing where portions of two light fluxes intersect.

16. A stereoscopic microscope, comprising:

an objective lens, having an optical axis, which causes a light flux from an observation object point to be substantially collimated;

left and right afocal zooming systems, each having an optical axis and each receiving the substantially collimated light from the objective lens;

left and right afocal relay systems which receive light from the left and right afocal zooming systems, respectively;

an ocular tube optical system which receives light from the left and right afocal relay systems and forms magnified images using an eyepiece lens in each of said left and right afocal light fluxes received from the left and right afocal relay systems; and at least one beam splitter that is arranged in each optical path between said left and right afocal zooming systems and said ocular tube optical system;

wherein the objective lens, the left and right afocal zooming systems, the left and right afocal relay systems, and the at least one beam splitter are accommodated in a housing of the stereoscopic microscope;

at least two regions are provided in the housing where portions of two light fluxes intersect;

in each said optical path between said left and right afocal zooming systems and said ocular tube optical system, there are two regions between said beam splitter and the ocular tube optical system where the optical axes of light fluxes from an observation object point intersect;

a region is also provided where a light flux that is reflected by a beam splitter in one light path that otherwise would pass to a primary observer intersects with a second light flux; and two additional regions are provided where light that has been reflected by a beam splitter in one light path that otherwise passes light to one eye of a primary observer intersects with light that has been reflected by a beam splitter in another light path that otherwise passes light to a different eye of the primary observer.

* * * * *